No. 893,005. PATENTED JULY 14, 1908.
J. H. MITCHELL.
MACHINE FOR SHEETING DOUGH.
APPLICATION FILED OCT. 3, 1905.

2 SHEETS—SHEET 1.

WITNESSES:

INVENTOR
James H. Mitchell
BY
ATTORNEY.

No. 893,005. PATENTED JULY 14, 1908.
J. H. MITCHELL.
MACHINE FOR SHEETING DOUGH.
APPLICATION FILED OCT. 3, 1905.
2 SHEETS—SHEET 2.
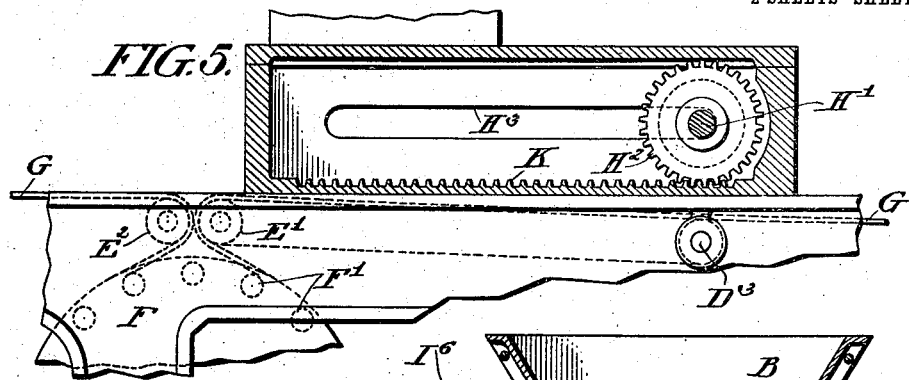
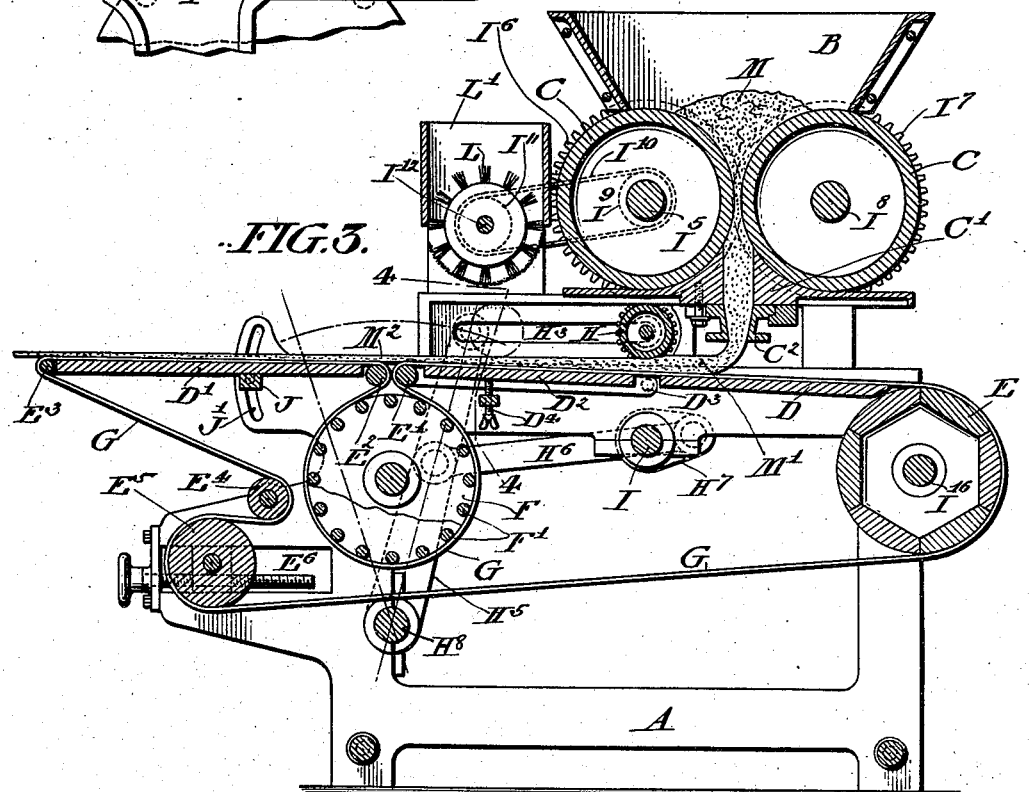
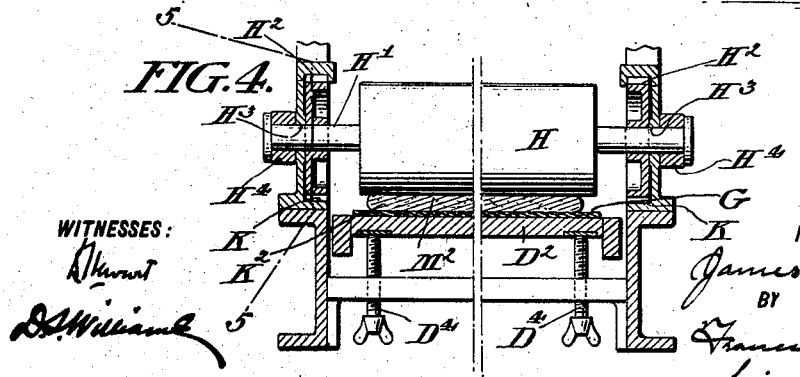

UNITED STATES PATENT OFFICE.

JAMES H. MITCHELL, OF PHILADELPHIA, PENNSYLVANIA.

MACHINE FOR SHEETING DOUGH.

No. 893,005.      Specification of Letters Patent.      Patented July 14, 1908.

Application filed October 3, 1905. Serial No. 281,122.

*To all whom it may concern:*

Be it known that I, JAMES H. MITCHELL, a citizen of the United States of America, residing in the city and county of Philadelphia, in the State of Pennsylvania, have invented a certain new and useful Improvement in Machines for Sheeting Dough, of which the following is a true and exact description, reference being had to the accompanying drawings, which form a part thereof.

My invention relates to the construction of machinery for forming dough into sheets and has for its object to provide mechanism which will accomplish this purpose and form a sheet of dough thoroughly worked and compacted, having a good texture throughout and especially a smooth and homogeneous surface or skin.

Dough sheeting machines have heretofore been devised in which feeding mechanism delivered a sheet of dough to a traveling belt and in which kneading mechanism worked over the belt operating upon the dough as it passed along with the belt; such mechanism for instance, is shown in my former patent No. 576,373 of February 2nd, 1897. The kneading roller in this old construction was given an up and down motion and also a rotary motion, but while the machine proved useful the texture and skin of the dough sheet as delivered from this machine left much to be desired.

In my present machine the characteristic novel feature is a reciprocating kneading roller moving through a path at an angle to that traveled by the carrier belt and rolling the dough in both directions, a device which I have found to give a texture and surface to the sheet of the most desirable kind.

Figure 1:
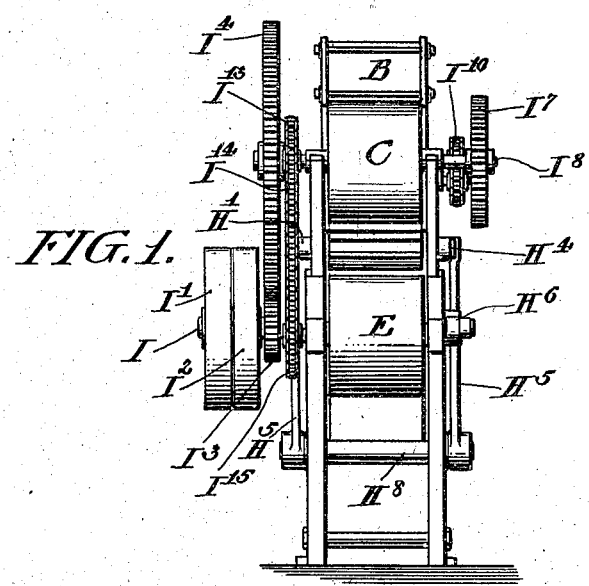
Figure 2:
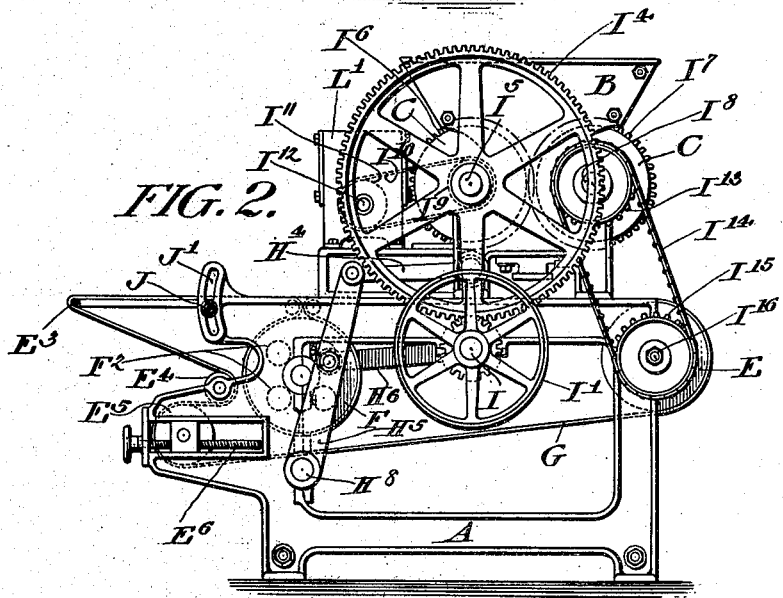

The nature of my mechanism and the character of my invention will be best understood as described in connection with the drawings which illustrate a machine having my improved features of construction and in which Figure 1, is a rear elevation of the machine. Fig. 2, a side elevation thereof. Fig. 3, an enlarged central longitudinal section through the machine. Fig. 4, an enlarged cross-section on the line 4—4 of Fig. 3, and Fig. 5, a section on the line 5—5 of Fig. 4.

A, indicates the frame of the machine, B, the hopper into which the dough is charged; C, C, the feed rolls, C', a forming die below the feed rolls ending in a nozzle $C^2$.

D, D' are stationary supporting platforms secured on the frame and $D^2$, a pivoted supporting platform hinged at $D^3$, and angularly adjustable as by means of the adjusting screw at $D^4$.

E, is a drum for the traveling belt; E' and $E^2$, belt rollers located as shown between the adjacent ends of the platform sections D', and $D^2$.

$E^3$, is a roller at the end of the platform D'. $E^4$, a stationary guide roller and $E^5$, a guiding and tightening roller laterally adjustable by means of the screw $E^6$.

F, is a dusting cylinder, the circumference of which is made of crossbars indicated at F'; $F^2$, see Fig. 2, indicating handholes in the side of this cylinder by which it can be charged with flour or its interior gotten at for purposes of adjustment or repair.

G, is a traveling belt passing over the drum E, thence over the roller E', down over the dusting cylinder F, and up over the roller $E^2$, thence passing over the platform section D', and over the guide rolls $E^3$, and $E^4$, and the tightening roller $E^5$, back to the drum.

H, is a kneading roller secured to a shaft H', to which shaft are secured the gear wheels $H^2$, $H^2$. The ends of the shafts pass through the guide slots $H^3$, and connected with them connecting rods $H^4$, which are again connected to the upper ends of the oscillating levers $H^5$, which levers are connected through the rods $H^6$ pivoted at $H^8$, with a crank $H^7$, on the driving shaft I. The gear wheels $H^2$, work in racks K, best shown in Fig. 5, by means of which the kneading roll is alternately rotated in opposite directions as it moves backward and forward.

I, is the driving shaft of the machine having, as shown, the fast and loose pulleys I' and $I^2$. To this shaft, in addition to the crank $H^7$, is secured the gear wheel $I^3$, which engages and drives the gear wheel $I^4$, secured to the shaft $I^5$, to which shaft is also secured one of the feed rolls C, and a gear wheel $I^6$, which engages with a gear wheel $I^7$, on the shaft $I^8$, to which last mentioned shaft is secured the other feeding roll C. The sprocket wheel $I^9$, secured on the shaft $I^5$, communicates motion through a chain $I^{10}$, and a sprocket $I^{11}$, with a shaft $I^{12}$, to which is secured a feeding brush L, moving in a hopper L', with a sieve bottom which is intended to be charged with flour, the brush being arranged to dust the flour down on the dough sheet and on the kneading roll when the latter is at the terminal point of its travel remote from the roll E. A sprocket wheel $I^{13}$, on the shaft $I^8$, communicates motion through the chain $I^{14}$, and the sprocket wheel $I^{15}$, to the shaft $I^{16}$, of the drum E.

In operation, the dough indicated at M, is charged into the hopper B, and fed down through the friction rolls C, into the die and nozzle $C^2$, on to the surface of the belt G, which belt is supported on the platform sections D′, and $D^2$, the section $D^2$, lying beneath the reciprocating path of the kneading roll H, and slightly inclined to said path. Preferably the angle at which section $D^2$ is inclined to the path of the kneading roll can be changed and this most conveniently by hinging the platform section $D^2$, and providing adjusting devices, such as the screw $D^4$, for changing its angular alinement and of course the angular alinement of the portion of the belt supported upon it. The dusting brush L, is arranged to dust flour upon the surface of the portion $M^2$ of the dough sheet which has passed out of engagement with the kneading roll, and also upon the portion $M^1$ of the dough sheet which is being operated upon by the kneading roll and it is advisable that the lower surface of the sheet shall also be dusted with flour which is conveniently done by passing the carrier belt down over the dusting cylinder F, so that when it comes upward again to the level of the platform D′, its upper surface will be thoroughly covered with flour upon which flour covering the dough sheet will rest.

It is unnecessary to further specify the detailed operation of the machine as it has been made sufficiently clear in the description of the parts and practically embodies little or no novelty over my former patented machine. I will however note that the platform section D′, is pivotally supported concentrically with the roller $E^2$, and adjusted by the stop J, moving in the curved slot J′.

Having now described my invention, what I claim as new and desire to secure by Letters Patent is,

1. In a machine for sheeting dough, a traveling belt, a supporting platform over which the belt passes, a reciprocating kneading roller traveling over the belt and supporting platform through a path slightly inclined to the plane of the belt, and means for feeding dough to the belt.

2. In a machine for sheeting dough, a traveling belt, a supporting platform over which the belt passes, a reciprocating kneading roller traveling over the belt and supporting platform through a path at an angle to the plane of the belt, means for adjusting the angular position of the platform with respect to the path of the roller, and means for feeding dough to the belt.

3. In a machine for sheeting dough, a traveling belt, a supporting platform over which the belt passes, a reciprocating kneading roller traveling over the belt and supporting platform through a path slightly inclined to the plane of the belt, means for dusting flour on the dough sheet at the outer terminal point of the path of the roller, and means for feeding dough to the belt.

JAMES H. MITCHELL.

Witnesses:
ARNOLD KATZ
D. STEWART.